United States Patent
Barth et al.

(10) Patent No.: US 6,640,292 B1
(45) Date of Patent: Oct. 28, 2003

(54) SYSTEM AND METHOD FOR CONTROLLING RETIRE BUFFER OPERATION IN A MEMORY SYSTEM

(75) Inventors: Richard M. Barth, Palo Alto, CA (US); Ramprasad Satagopan, San Jose, CA (US); Anil V. Godbole, Cupertino, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/393,884

(22) Filed: Sep. 10, 1999

(51) Int. Cl.[7] .......................... G06F 12/00; G06F 13/00
(52) U.S. Cl. ...................... 711/168; 711/133; 711/151; 710/36; 710/52
(58) Field of Search .................... 711/133, 150, 711/151, 168; 710/5, 36, 52

(56) References Cited

U.S. PATENT DOCUMENTS

| | | | | |
|---|---|---|---|---|
| 5,517,660 A | * | 5/1996 | Rosich | 710/52 |
| 5,828,606 A | | 10/1998 | Mick | 365/189.05 |
| 5,907,860 A | * | 5/1999 | Garibay et al. | 711/117 |
| 6,081,478 A | | 6/2000 | Mick et al. | 365/233 |
| 6,237,067 B1 | * | 5/2001 | Eberhard et al. | 710/5 |
| 6,247,102 B1 | * | 6/2001 | Chin et al. | 711/126 |
| 6,330,645 B1 | * | 12/2001 | Harriman | 711/151 |
| 6,343,352 B1 | * | 1/2002 | Davis et al. | 365/194 |
| 6,442,655 B1 | * | 8/2002 | Eberhard et al. | 711/151 |
| 6,463,514 B1 | * | 10/2002 | Ray et al. | 711/168 |

* cited by examiner

*Primary Examiner*—Reginald G. Bragdon
*Assistant Examiner*—Pierre M. Vital
(74) *Attorney, Agent, or Firm*—Pennie & Edmonds LLP (57) ABSTRACT

A system and method for controlling data access in a memory system is disclosed. The memory system is characterized by the use of a transport and retire write request, memory devices incorporating a retire buffer, and inherent data retirement. Addresses associated with un-retired write data are stored in the memory controller and compared to the address of a read request following one or more write requests. Where a read request is directed to an address associated with an un-retired write data, the read request is stalled in the memory controller.

17 Claims, 10 Drawing Sheets

State Machine Description

| Old State | Arc | Input Conditions | Output Action Taken | New State |
|---|---|---|---|---|
| Idle | 1 | Any Non-Write Request | None | Idle |
| Idle | 2 | Write Request | Issue Write Request | Write |
| Write | 3 | Write Request | Issue Write Request | WW |
| Write | 4 | No Request or Read Request | No Action | Wait1 |
| Wait1 | 5 | Write Request | Issue Current Write Request and Retire the Pending Write | Write |
| Wait1 | 6 | Read Request to Location Having a Pending Retire Operation | 1) Return Data Directly from Write Data Buffer in Memory Controller, or 2) Stall the Read Request, and Issue a Retire Request | Wait1 |
| Wait1 | 9 | Read Request to a Different Location, or No Request | Issue Current Read Request and Retire the Pending Write | Idle |
| WW | 7 | No Request, or Read Request to Different Location | Issue Current Request and Issue a NOP to Retire First Pending Write | Wait1 |
| WW | 10 | Read Request to Location Having a Pending Retire Operation | Issue NOP and Retire First Pending Write | Wait1 |
| WW | 8 | Write Request | Issue Current Write and Retire First Pending Write | WW |

FIG. 10

SYSTEM AND METHOD FOR CONTROLLING RETIRE BUFFER OPERATION IN A MEMORY SYSTEM

FIELD OF THE INVENTION

A system and apparatus for controlling data access in a memory system having memory devices with a retire buffer is disclosed. The method and apparatus are particularly well adapted for use in a memory system implementing write requests in two steps: transport and retire.

BACKGROUND OF THE INVENTION

During the last several decades, memory technology has progressed dramatically. The density of commercial memory devices, taking Dynamic Random Access Memory (DRAM) as a convenient example, has increased from 1 Kbit to 64 Mbits per chip, a factor of 64,000. Unfortunately, memory device performance has not kept pace with increasing memory device densities. In fact, memory device access times during the same time period have only improved by a factor of 5. By comparison, during the past twenty years, microprocessor performance has increased by several orders of magnitude. This growing disparity between the speed of microprocessors and that of memory devices has forced memory system designers to create a variety of complicated and expensive hierarchical memory techniques, such as Static Random Access Memory (SRAM) caches and parallel DRAM arrays.

Further, now that computer system users increasingly demand high performance graphics and other memory hungry applications, memory systems often rely on expensive frame buffers to provide the necessary data bandwidth. Increasing memory device densities satisfy the overall quantitative demand for data with fewer chips, but the problem of effectively accessing data at peak microprocessor speeds remains.

In conventional DRAMs, including Extended Data Output (EDO) devices and SRAMs, a simple protocol is used for memory access. Memory access requests typically include a Row Address Strobe (RAS or Row) request, followed by one or more Column Address Strobe (CAS or Column) requests, and an optional Precharge request. Other well known maintenance requests, such as Refresh, are also performed, but these requests need not be reviewed in detail to understand the present invention.

In an attempt to improve data access speed, conventional memory systems "pipeline" memory access requests on the bus(es) to improve efficiency. Pipelining is a form of bus multiplexing which communicates a time-multiplexed sequence of memory access requests from a memory controller to one or more memory devices.

While pipelining memory access requests generally improves efficiency, it also creates problems. For example, differing timing and physical constraints for the memory system resources involved in memory requests can stall the pipeline for certain access request sequences. At a minimum, the "bubbles" formed in the flow of data by these constraints increase data access time, thus reducing the access efficiency initially sought by implementing a memory system with pipelining.

Figure 1:
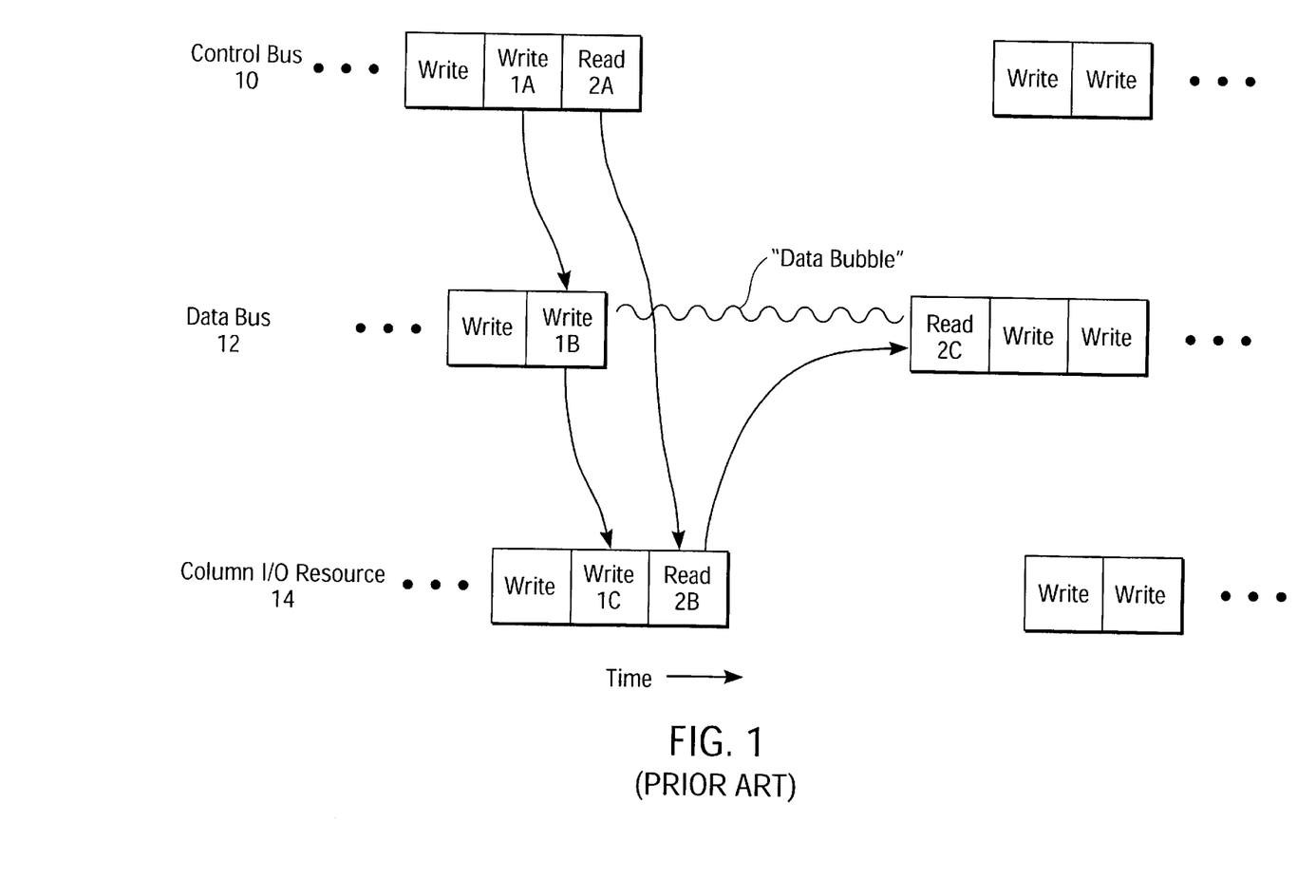
FIG. 1 illustrates a data bubble occurring in a conventional memory system.

An example of a data bubble is illustrated in FIG. 1. In the example, three signal groups are related in time. A sequence of read and write requests are sent via a control bus 10. Data is sent via a separate data bus 12. Column I/O signaling (or a column I/O resource 14) accesses the internal core of the DRAM in response to the read/write requests. The example assumes a series of write requests followed by a read request. In this example, the unavailability of the column I/O resource 14 causes a data bubble on data bus 12 as the memory system executes the second write request 1A and thereafter the read request 2A.

In particular, packet commands indicating a write request 1A appears on control bus 10, followed by corresponding write data 1B which appears on data bus 12 a short time later. Once the write data 1B appears on data bus 12, the column I/O resource 14 actually accesses the DRAM core and writes the data 1C into memory. However, well before column I/O resource 14 is finished performing write request 1C, a packet command indicating a read request 2A appears on control bus 10. The read request can not be performed until the column I/O resource 14 becomes available. The resulting time lag in read data 2C appearing on data bus 12 results from the additional time required to finish write 1C, to make column I/O resource 14 available, and to perform read request 2B.

In the conventional pipelined memory system, data access stalling occurs with each data bubble created when a read request follows a write request, (or when a read request follows multiple write requests, as determined by the particular timing requirements of the memory system). Such repeated stalling unacceptably lowers data access efficiency in the memory system.

Of further note, conventional memory controllers have been designed which include write by-pass buffers and write stall buffers. In fact, write by-pass buffers have often been incorporated further "up-stream" from the memory controller in the microprocessor. Write bypass buffers simply store a write command, including the write data, in a buffer in a microprocessor or memory controller. If a following read command is directed to the address of the buffered write command, the normal data read routine is by-passed and the desired data is taken directly from the write by-pass buffer. Write stall buffers uniformly delay the execution of all write commands by some predetermined period of time.

However, conventional write by-pass and stall buffers do not solve the problem of pipeline data bubbles. Further, such conventional write buffers hold write data outside the memory system, and in particular hold write data outside the memory device.

SUMMARY OF THE INVENTION

In a memory system executing write requests using transport and retire steps in a system comprising a memory controller and memory devices having a retire buffer, the present invention insures data accuracy and proper scheduling of memory access requests. Read requests following one or more write requests are evaluated on the basis of their address, or an address component, in relation to the address associated with one or more write requests having un-retired write data.

In one aspect, the present invention incorporates an un-retired write buffer and at least one comparator circuit in a memory controller. When a write request is received in the memory controller, an address, whether a partial address or a full address, associated with the write request is stored in the un-retired write buffer. Two or more consecutive write requests may have an associated write address queued in the un-retired write buffer.

Write data stored in one or more retire buffers in a memory device is inherently retired according to the memory system constraints, most notably bus timing constraints.

When a read request is received in the memory controller following one or more write requests, the read address associated with the read request is compared to write address (es) stored in the un-retired write buffer. If the read address matches a write address in the un-retired write buffer, the read request is stalled in the memory controller until such time as the write data corresponding to the matching write address is retired.

If the read address does not match any write address(es) in the un-retired write buffer, the read request is issued and may be executed before the write data stored in one or more retire buffers is retired into memory.

According to this aspect of the present invention, only read requests to addresses having a pending retire operation cause a stall in the memory controller. All other read requests may immediately executed. In this manner, read data accuracy is preserved while maintaining the data efficiency offered by a pipelined memory system and a transport and retire write request.

DETAILED DESCRIPTION

The present invention is particularly useful and readily adapted for use in emerging, high speed memory systems. The assignee of the present invention has pioneered the development of next generation memory systems having a relatively narrow, high speed bus(es) and associated memory devices, along with the interface technology required to provide high data throughput. See, U.S. Pat. Nos. 5,319,755; 5,243,703; and 5,254,883, the disclosures of which are incorporated herein by reference.

Figure 2:
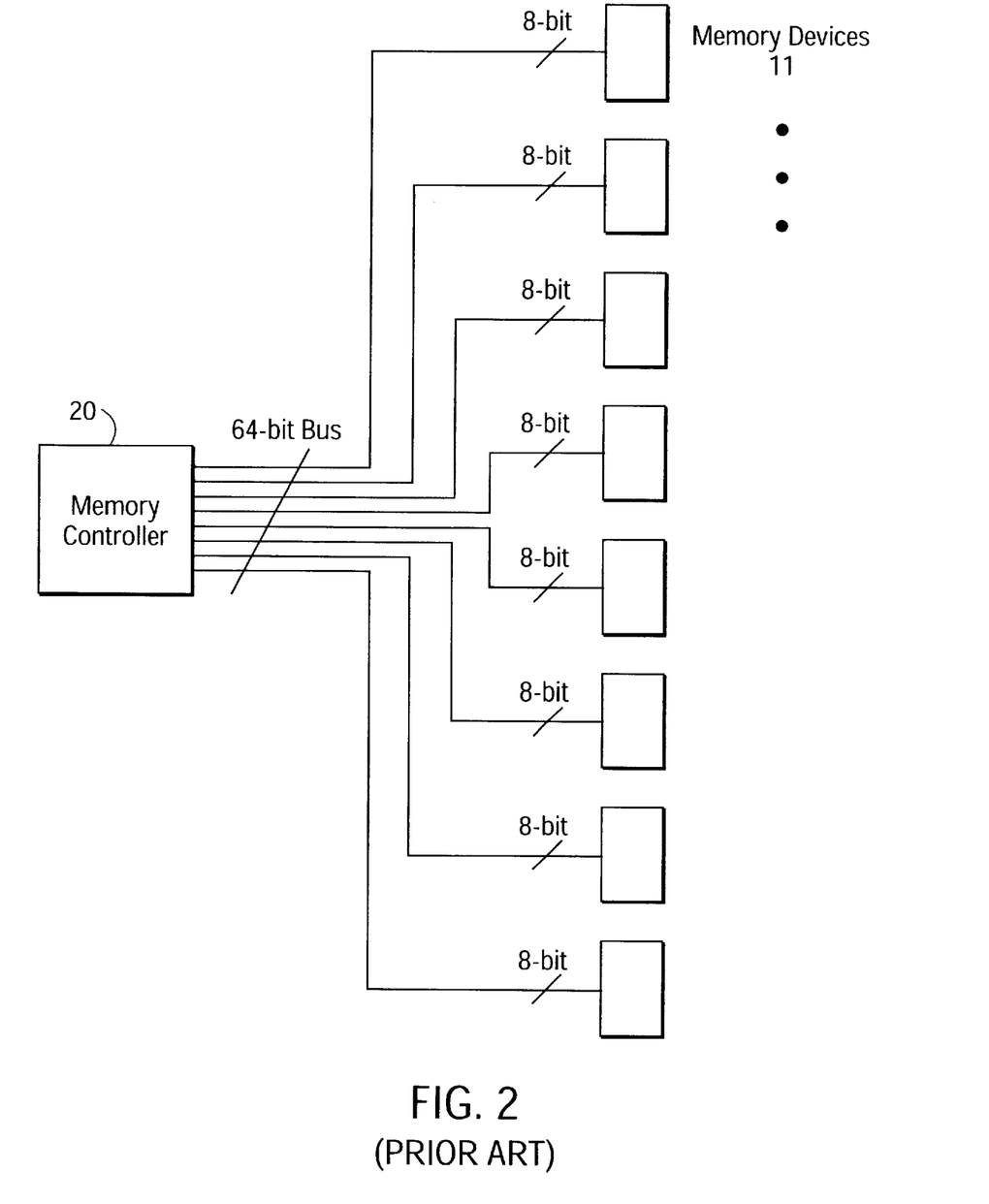
FIG. 2 shows a conventional memory system characterized by a relatively wide data bus and slow access speed.
Figure 3:
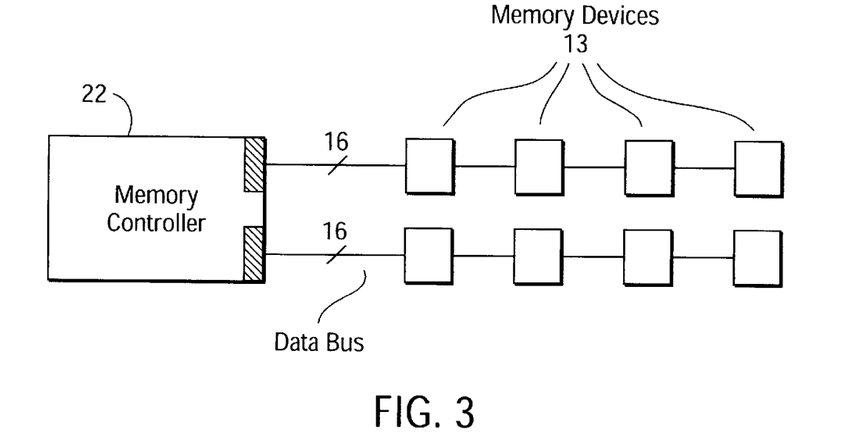
FIG. 3 shows a memory system adapted to the present invention characterized by a relatively narrow data bus and high data throughput.

Very general differences between conventional memory systems and the assignee's memory systems can be seen by comparing FIGS. 2 and 3. In FIG. 2, eight 8-bit memory devices 11 are connected to a memory controller 20 by a 64-bit bus. Assuming 8-bit bytes and a system clock running at 100 MHz, the total data throughput for the conventional system is 800 MB/sec.

In FIG. 3, eight 8-bit memory devices 13 according to the assignee's design are connected to a memory controller 22 by a data bus, along with a control/address bus (not shown). Since each of the assignee's memory devices is capable within the memory system architecture of communicating data at up to 800 MHz across a two byte wide channel, the example has a total data throughput of 3.2 GB/sec.

In effect, the assignee's solution replaces costly, conventional memory subsystems and interconnections with a single, standard chip-to-chip bus and improved memory devices. The term "memory device" as used in this document broadly describes a range of devices capable of storing data, and receiving and/or transmitting data at the request of a controlling device. All forms and configurations of DRAMs, SRAMs, and ROM devices are contemplated by the term memory device. One defining feature of the term memory device is the presence of electronically accessible data stored in the row and column structure typical of the foregoing devices.

In addition to the referenced U.S. Patents, information describing the assignee's memory systems and memory devices may be had at Rambus™ Inc., Mountain View, Calif. See, for example, the Direct RDRAM™ 64/72-Mbit Data Sheet, the Direct RAC Data Sheet, the Direct RMC.d1 Data Sheet, A Logical View of the Direct Rambus Architecture, Direct Rambus Technology Overview, Direct Rambus Clock Generator Source Sheet, Direct Rambus RIMM™ Module Data Sheet, the Direct Rambus Memory Controller Summary, all 1998 documents and all incorporated herein by reference.

Figure 4:
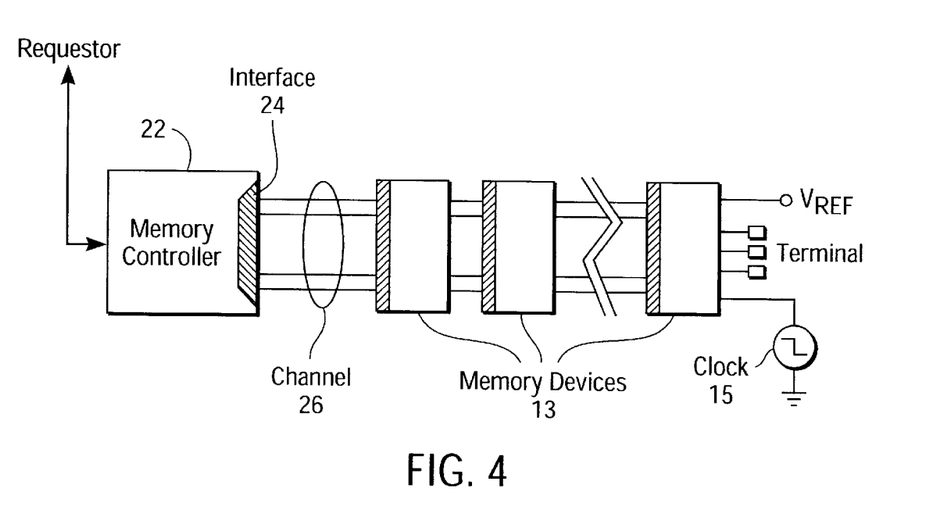
FIG. 4 show the memory system of FIG. 3 in some additional detail.

An exemplary memory system incorporating the present invention is generally shown in FIG. 4, wherein a memory controller 22 is connected to a plurality of memory devices 13 via a channel 26. Memory controller 22 and memory devices 13 typically include an interface 24 to channel 26. The memory devices are preferably 16 bit or 18 bit (2 byte) devices, but one of ordinary skill in the art will appreciate that the memory devices might be configured with any convenient number of bits and with any definition of byte size. Memory devices 13 only respond to memory controller 22, and accordingly require a relatively low level of intelligence. As a result, memory device die size overhead is minimized to keep the memory devices affordable.

Memory controller 22 is the only device generating commands to memory devices 13. Data transfers occur only between memory controller 22 and memory devices 13, never between memory devices. Memory controller 22 interfaces with a "requester," external to the memory system. Generically, the requestor is any device requesting data to be read/written from/to the memory system or performing memory device maintenance such as refresh, and may include, alone or in any combination, a conventional microprocessor, peripheral device, ASIC, conventional memory controller, or graphics chip. Memory controller 22 receives a command from the requestor and translates the address, data, and control components of the command into a protocol common to memory controller 22 and memory devices 13.

Channel 26 connotes a system level specification defining a number of buses and signal lines, as well as their electrical and mechanical interfaces, including signaling levels and signal timing. A number of signal types may be present on channel 26 at any given time. In addition to a data bus, an address/control bus, reference voltage signals and clock signals are apparent on channel 26.

On channel 26, data, control information, and address information move in packets. Each packet is transferred via channel 26 during a defined period of time. In one presently preferred embodiment, the period of time is four clock cycles, but any number of clock cycles might be conveniently used. Control/address information may be multiplexed with data on a single bus structure, however as presently preferred, an independent control/address bus is used, and only data is transferred via a separate data bus.

Memory controller 22 is preferably a "constraint tracking" controller. A constraint tracking memory controller explicitly models all the logical and physical constraints to a memory access request before executing the request. In other words, if a requested operation does not violate any memory system constraints it is transmitted from memory controller 22 to memory devices 13 via channel 26. If it violates any constraint, it must wait until the constraint is remedied. This type of controller can be complex, but such complexity provides optimal performance in all possible memory system conditions, i.e., requested data transfer size, memory device or bank access requirements, number and type of outstanding requests, etc.

Figure 5:
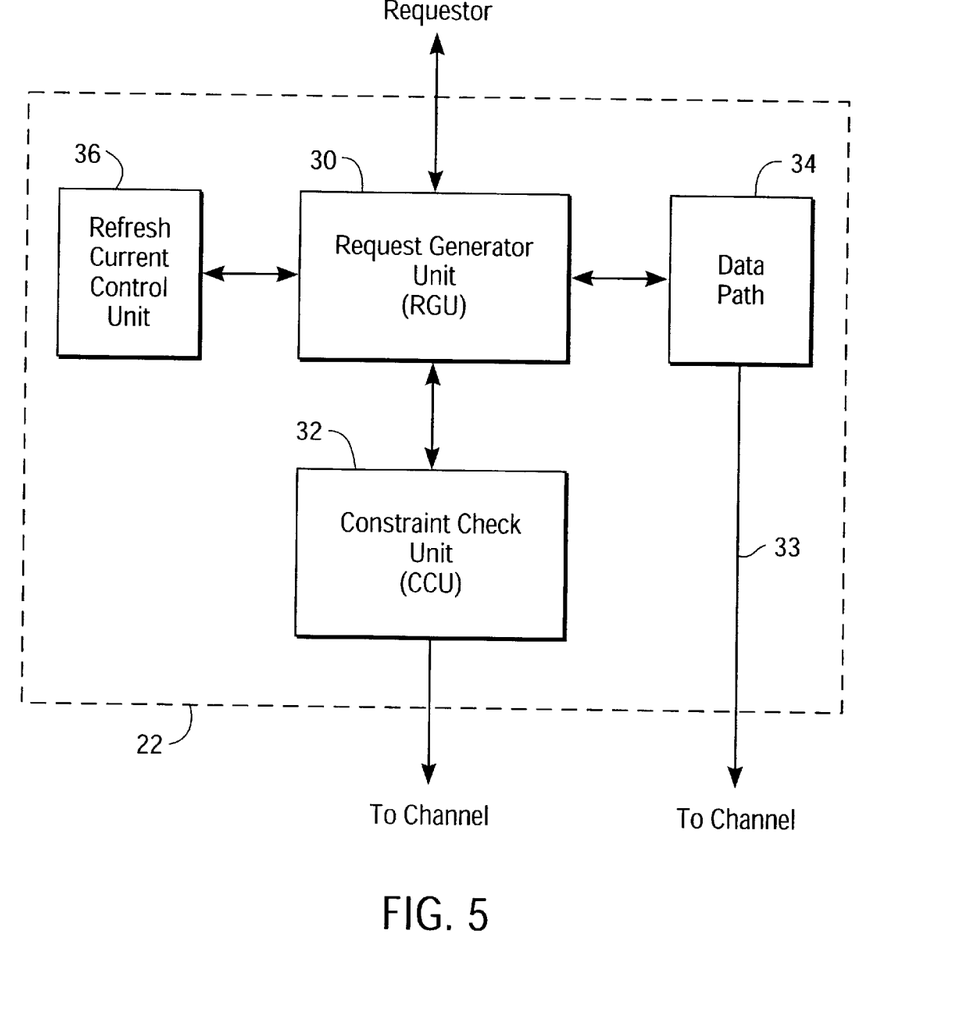
FIG. 5 shows the memory controller of FIG. 4 is some additional detail.

An exemplary block diagram of a memory controller according to the present invention is shown in FIG. 5. Memory controller 22 comprises a Request Generator Unit (RGU) 30, a Constraint Check Unit (CCU) 32, Datapath 34, and a Refresh/Current Control Unit 36.

Refresh and Current Control Unit 36 takes care of all refresh, current calibration and slew rate control, i.e., temperature calibration, requirements for the memory system.

RGU 30 receives control information defining a requested transaction from a requestor, and generates requests for such Row and Column packets as are necessary to implement the requested transaction. These RGU generated requests are sent to CCU 32. RGU 30 also controls the Datapath 34 which buffers read and write data.

CCU 32 tracks the state of the memory devices to prevent violation of any timing and retire constraints. CCU 32 receives the packet requests from RGU 30 and outputs corresponding formatted packets (ROW and COL packets) to the memory devices via the control/address bus portion of channel 26.

To simplify memory controller design in the present invention, logical constraints are preferably considered separately from timing constraints, and retire constraints. Logical constraints, such as whether the memory controller can activate a memory bank unless all neighboring banks are closed, are tracked by the RGU. Timing constraints and retire constraints are tracked by the CCU. A typical timing constraint is a prohibition on activating a memory bank until precharging of the bank is complete. Retire constraints are discussed more fully below.

High data throughput memory systems such as the one illustrated above are particularly susceptible to the problem of data stalling. That is, the extent to which data may be rapidly transferred between a memory controller and a plurality of memory devices connected via a bus is determined, at least in part, by numerous timing and resource constraints. In one particular example of these constraints, a read request following a write request may occur on the bus only after completion of the write request to ensure accuracy of the data being read.

This read-following-write constraint is further complicated by the use of a single bidirectional data bus in the exemplary memory system. Since all memory devices share a common bidirectional bus with the memory controller, a read request must wait until the write data from the prior write request has been written into memory. Only after the prior write request is complete can the read request utilize the bidirectional data bus to return data to the memory controller. This constraint, in effect, creates a data bubble, or time delay, between the write request and the read request, as explained above with reference to FIG. 1. The particular timing characteristics of a memory system will dictate the extent of this delay.

In one approach to dealing with the foregoing constraint, the write request is partitioned into a transport step and a retire step. A Method and Apparatus for Two Step Memory Write Operations is disclosed in U.S. patent application Ser. No. 09/169,736 which is commonly assigned and incorporated herein by reference. The functional division of the write request requires that each memory device incorporate a retire buffer. The retire buffer contemplated by the present invention is very different from the conventional write by-pass or write stall buffers which reside in the memory controller or requestor, and, thus, hold write data outside the memory device(s).

Figure 6:
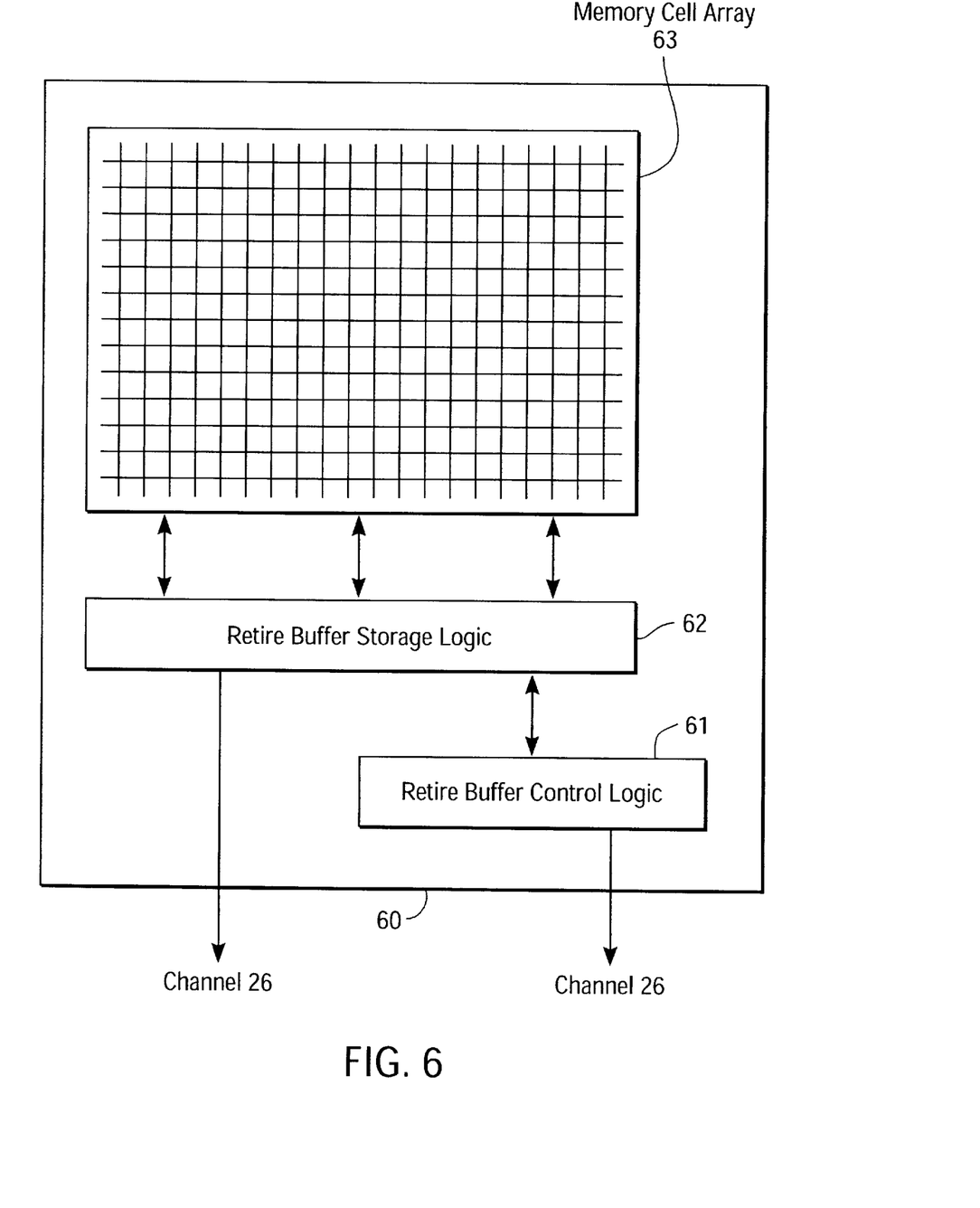
FIG. 6 illustrates the implementation of a retire buffer in an exemplary memory device.

FIG. 6 illustrates, at a block diagram level, an exemplary memory device 60 having a retire buffer. In a presently preferred embodiment, the retire buffer comprises retire buffer control logic 61 and retire buffer storage logic 62. Retire buffer control logic 61 receives control data and controls retire buffer storage logic 62 which receives data from the data bus and holds the data until it is placed in memory cell array 63.

Data bubbles may be removed from the flow of data between the memory controller and the memory devices by use of a retire buffer. However, introduction of the retire buffer imposes a new set of constraints and requirements on the memory system. These new constraints must be satisfied to achieve the dual objectives of correctly completing memory requests, and providing memory system performance enhancements through the elimination of data bubbles. The first objective, correctly completing memory commands, requires that data read from the memory device be correct for any sequence of memory requests.

In a memory system utilizing a retire step as part of a write request, data may be retired into memory either explicitly or implicitly. Explicit retirement takes place when a specific signal instructs the retire buffer to retire data into memory. Explicit retirement allows exact control over the timing of data retirements, but does so at the price of greatly expanded memory system overhead, control bandwidth, and memory device die space.

As presently preferred, the present invention retires data implicitly. Taking the Direct RDRAM (Rambus Dynamic Random Access Memory) example referenced above, a retire operation happens automatically, i.e., without explicit command, when certain conditions are satisfied. For example, data is properly retired only if 1) a valid Column command packet is received at the memory device having un-retired write data, 2) the un-retired write data has been pending in the memory device retire buffer for some minimum period of time, and 3) the present command is not a read command to the memory device having un-retired write data. In one preferred embodiment, the minimum "wait" time in the second condition above is at least one command cycle. At any given time, no more than two retire operations may be pending. This is true for the Direct RDRAM example due to channel level constraints.

In any hardware configuration, the introduction of a retire buffer into memory devices places additional demands upon the memory system. These additional demands fall on the memory controller. The memory controller must obey all of the new constraints associated with the use of a retire buffer and the two step write request. At a minimum, proper use of the retire buffer entails the scheduling of memory access requests according to certain specific sequence(s). Such specific sequence(s) allow the memory system to optimally retire write data in response to subsequent requests following transport of write data to a retire buffer. The specific sequence(s) ensure data accuracy when selected read requests are allowed to bypass previous write requests.

In sum, the memory controller must be designed to properly use the retire buffer. Thus, the memory controller may be required to incorporate additional hardware necessary to control retire buffer operations, and to implement one or more methods by which read and write requests are efficiently executed in a memory system having memory device retire buffers.

The present invention provides a memory controller which effectively and accurately executes memory access requests while suppressing data bubbles through the use of a transport and retire write request. Several exemplary methods are discussed below which illustrate the present invention in the context of the Direct RDRAM. Where required, exemplary hardware changes to the Direct RDRAM memory controller are included to fully teach the present invention. Those of ordinary skill in the art will recognize that the Direct RDRAM context of the following explanation is merely illustrative. The present invention is not limited to the specific hardware and functional descriptions of the Direct RDRAM system, but is generally applicable to any memory system having a memory device retire buffer.

Each of the following exemplary methods assumes the use of a transport and retire write request in the memory system. The terms "transport" and "retire" are used to connote any two related memory operations which 1) communicate data from one point in a memory system to another point, and 2) thereafter store the data in memory. The step of storing the data is not necessarily performed immediately following the transport of the data. Further, the term "request" is used throughout to broadly describe a transfer or an exchange of signal(s) between a requestor and the memory controller, and/or between the memory controller and one or more memory devices to effect a transfer of data to or from the memory devices. Requests generally include read requests, write requests, and all other requests, referred to as non-read/write requests. The term "non-read/write request" encompasses all events which may take place in a memory system in a given time period, other than a read request or a write request. A "non-read/write request" includes such events as idle transactions.

In relation to idle cycles or idle transactions in the description which follows, it should be noted that the memory controller according to the present invention opportunistically takes advantage of such idle cycles to retire write data. During an idle cycle, the memory controller may retire pending write data by issuing a NOP command and associated mask data to cause write data retirement.

In one embodiment of the present invention, write data is stored in the memory controller until it is retired in a memory device. By holding un-retired write data in a special buffer, the memory controller can provide the data directly to a requestor in the event that a read request is performed to a memory address associated with the un-retired write data. This method requires that a specialized buffer, an un-retired write data buffer, be present in the memory controller. Further, additional control logic must be incorporated into the memory controller to bypass the normal memory access routines initiated by a read request directed to an address associated with un-retired write data, and to, instead, return data directly from the un-retired write data buffer. This general approach to buffering un-retired write data in the memory controller may be implemented using many aspects of the memory controller hardware illustrated below.

In another embodiment of the present invention, all read requests are stalled in the memory controller until all pending retire operations are complete. While simple, this method offers relatively lower performance since all read requests arriving in the memory controller while write data is pending will be delayed.

In yet another embodiment, only read requests directed to a memory address associated with un-retired write data are stalled in the memory controller. All other read requests may proceed before (or with) pending retire operations. This method allows effective tradeoff between memory system complexity and data access performance.

Figure 7:
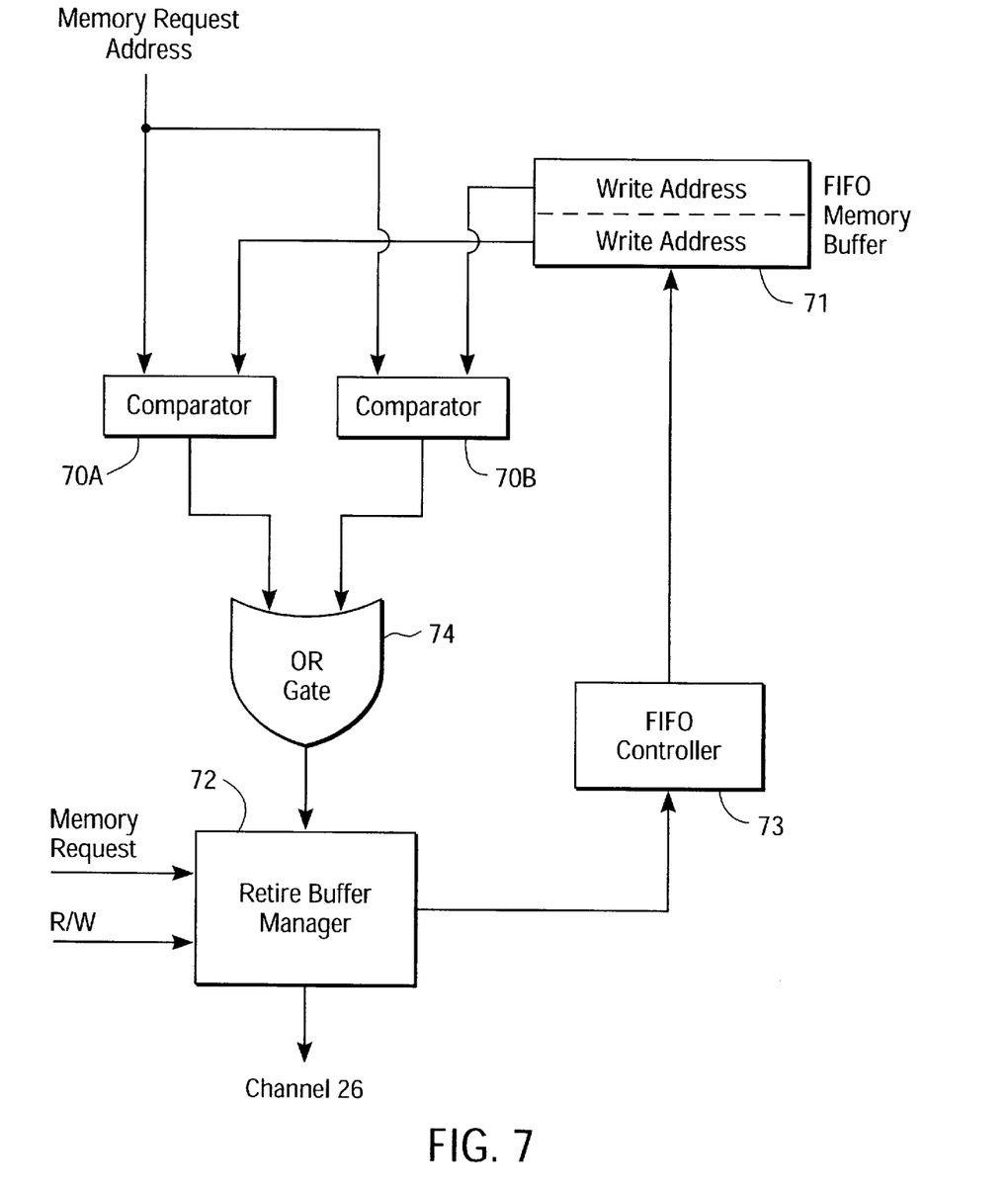
FIG. 7 shows an exemplary circuit adapted to implement the method of the present invention in a memory controller.

FIG. 7 illustrates one possible hardware implementation by which a memory controller may incorporate the present invention to properly manage read requests in relation to write data in the retire buffer. This example assumes, consistent with the continuing example of a Direct RDRAM memory system, that, at most, two retire operations may be pending in the memory system. Naturally, more than two pending retire operations may be accommodated at the expense of additional hardware.

Turning to FIG. 7, the address in memory for data corresponding to a current memory request operation is applied to a first comparator 70A and a second comparator 70B. The first comparator 70A compares the current memory request address to a first un-retired write address contained in a First-In-First-Out (FIFO) buffer 71. Similarly, the second comparator 70B compares the current memory request address to a second un-retired write address contained in FIFO buffer 71.

As used throughout, the term "address" denotes information identifying a location in memory. The address might be a only memory device ID; a memory device ID and memory bank designation; a memory device ID, memory bank designation, and row address within the memory bank; or a memory device ID, memory bank designation, and row address and a column address. Further, the address may include write mask information for the data. Increasing address specificity will result in fewer memory system stalls, but will also result in increased logic and control circuit complexity.

However, a memory system designer may well be constrained in the number of address bits which may be efficiently compared during this process. For example, address comparison might necessarily take place with respect to only a partial address if a full address comparison requires a prohibitively high gate count or violates some critical path timing constraint in the memory system.

Returning to FIG. 7, the outputs of the first and second comparators are applied to an OR gate 74, the output of which is applied to retire buffer manager 72. As further inputs, retire buffer manager 72 receives a memory request signal and a read/write (R/W) indicator. The memory request signal comprises at least the address of data associated with the current memory request.

When the R/W indicator identifies a current memory request as a write request, the retire buffer manager 72 receives the associated address—"the write address"—from the memory request signal and communicates the write address to a (First-In, First-Out) FIFO controller 73. FIFO controller 73 then places the received write address information in a FIFO memory element 71.

As presently preferred, retire buffer manager 72 implements an algorithm controlling the execution of read/write requests in relation to pending retire buffer data. The algorithm is explained with reference to the flowcharts shown in FIGS. 8A and 8B.

Figure 8A:
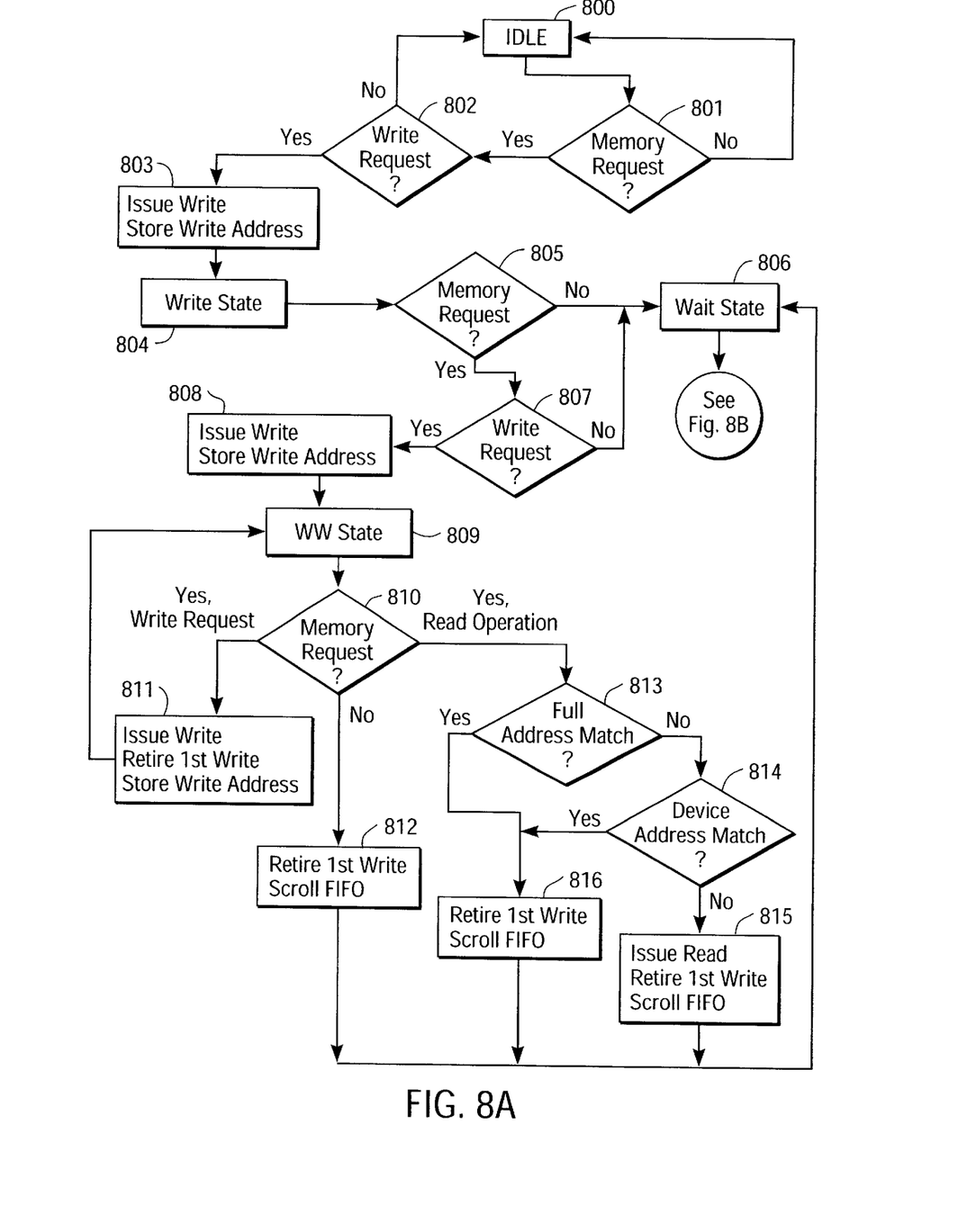
FIGS. 8A and 8B are flowcharts illustrating an exemplary algorithm capable of implementing one embodiment of the present invention.

Beginning with FIG. 8A, the system remains in IDLE 800 until a memory request is received 801 (801=yes). Throughout, a memory request will be a read request, a write request, or a non-read/write request. If the received memory request (801=yes) is other than a write request (802=no), the system returns to IDLE 800. If, however, the received memory request is a first write request (802=yes), the system issues the write request and stores the address 803 associated with the write request, hereafter referred to as the "write address," in the FIFO 71 of FIG. 7. The system "issues" a write (or read) request by executing the commands and communicating data customarily associated with such a request. Once the write request is issued and its write address stored 803 in FIFO, the system enters the WRITE state 804.

From the WRITE state 804, the system determines whether a next or second memory request 805 appears in the memory controller during a next time period. That is, transitions within the algorithm are defined by a sequence of time periods, typically comprising multiple memory system clock cycles. In any given time period, the memory system may receive a memory request, or not. Once in the WRITE state, the absence of a memory request (805=no) in the succeeding (second) time period will cause the system to enter a WAIT state 806. Transitions from the WAIT state will be discussed with reference to FIG. 8B below.

If within the second time period following entry into the WRITE state the system receives a second memory request (805=yes), a determination is made as to whether the memory request is a second write request 807. If not (807=no), the system enters the WAIT state 806.

If a second successive write request is received (807=yes), the system issues the second write request and stores the second write address 808 in the FIFO or un-retired write buffer. The system then enters the write-write (WW) state 809. Once again, while in the WW state one of three events will happen in the next (third) time period. Either a third write request will be received (810=yes for a write request), a non-read/write request will be received (810=no), or a read request will be received (810=yes for a read request).

In the event that a third, successive write request is received in the WW state, the system will issue the third write request, retire the data associated with the first write request (i.e. "the first write data"), and store the third write address information in FIFO 811. The system then returns to the WW state 809. Naturally, any successive, subsequent write requests will follow the same loop.

In the present embodiment, by storing the third write address in FIFO, the first write address information is "scrolled" from the FIFO. That is, the first write is replaced by the second write address, and the second write address is replaced by the third write address in FIFO. In other states described below, the FIFO may be scrolled without replacing the second write address. Thus, the memory system will remove a write address from the FIFO as its corresponding write data is retired into memory.

If when the system is in the WW state a non-read/write request is received during the third time period (810=no), the memory system will retire the first write data, and scroll the FIFO to remove the first write address 812. The system then enters the WAIT state 806.

If when the system is in the WW state a read request is received in the third time period (810=yes for a read request), the memory system must determine whether the address corresponding to the read request, "the read address," matches one of write addresses stored in the FIFO. As noted above, the specificity of the addresses compared within the memory controller is a matter of design choice. Accordingly, the address comparison subroutine will be defined, at least in part, by the nature of the addresses stored.

In the present example, a two level address comparison is performed. First, the full read address is compared to the stored write addresses 813. If the full read address matches one of write addresses (813=yes), or if the device address for the read request matches one of write addresses (814=yes), then the read request is stalled, i.e., not issued during the present time period. Rather, the first write data is retired and the first write address is scrolled from the FIFO 816. Thereafter, the system enters the WAIT state 806.

If, however, the full read address does not match a write address (813=no), and the device address for the read request does not match a write address (814=no), then the memory system will issue the read request, retire the first write data, and scroll the first write address from FIFO 815, before entering the WAIT state.

Figure 8B:
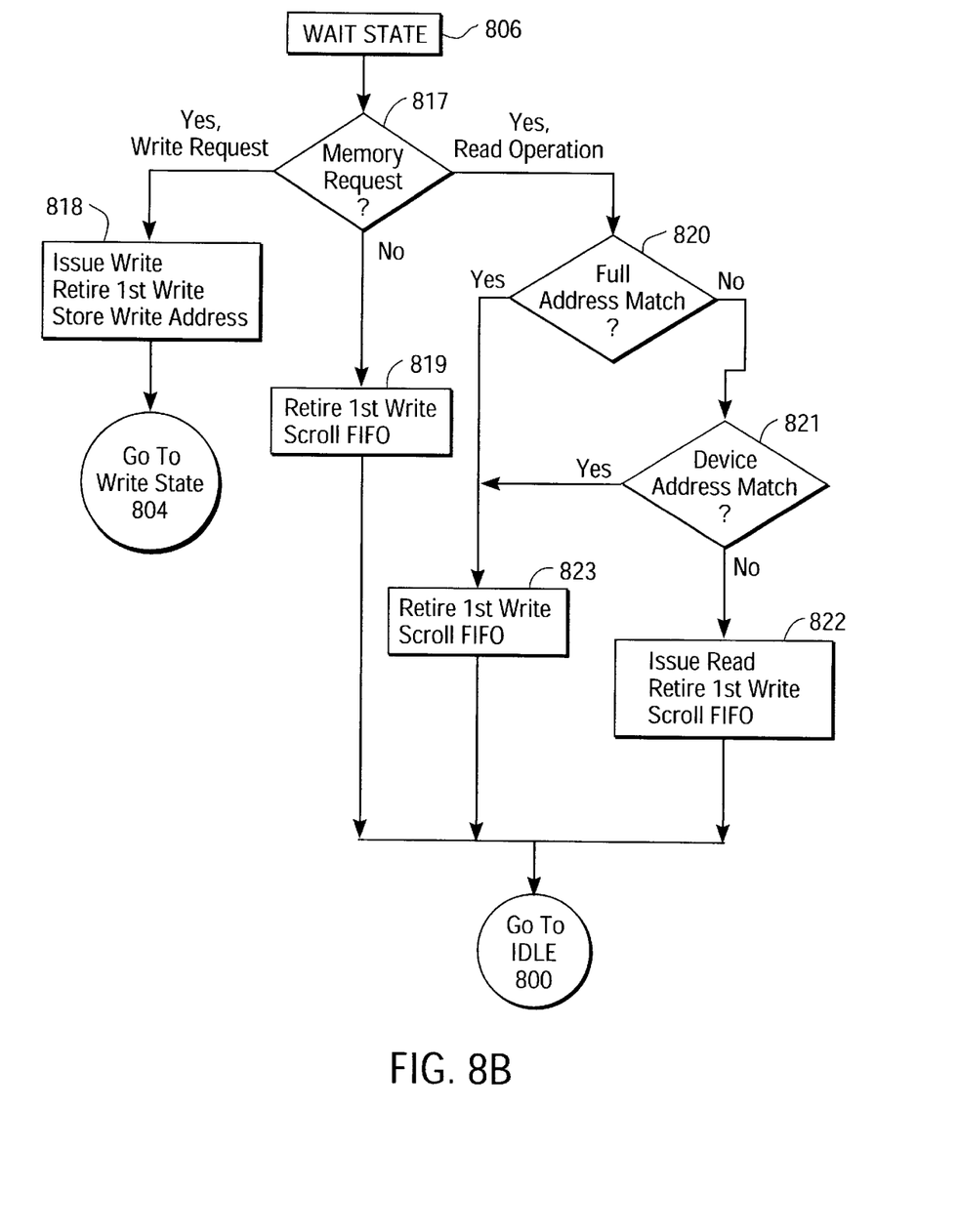

With reference to FIG. 8B, once in the WAIT state, if a non-read/write request is received in the subsequent time period (817=no), the memory system will retire the first write data, scroll the first write address from FIFO 819, and return to the IDLE state 800. If, in the WAIT state a write request is received (817=yes, for a write request), the memory system will issue the write, retire the first write data, scroll the first write address for FIFO 818, and return to the WRITE state 804.

As above, if a read request is received while in the WAIT state (817=yes, for a read request), the full read address is compared to the stored write address 820. If the full read address matches the stored write address (820=yes), or if the device address for the read request matches one of write addresses (821=yes), then the read request is stalled. Rather, the first write data, and now the only remaining write address in FIFO, is retired and the first write address is scrolled from the FIFO 823. Thereafter, the memory system returns to the IDLE state 800.

If, however, the full read address does not match a write address (820=no), and device address for the read request does not match a write address (821=no), then the system will issue the read request, retire the first write data, and scroll the first write address from FIFO 822, before entering the IDLE state 800.

The exemplary algorithm described above may be implemented using many different techniques recognized by one of ordinary skill in the art. As presently preferred, however, the algorithm is implemented in a finite state machine, such as the one illustrated in FIG. 9 and described in the Table shown in FIG. 10.

Figure 9:
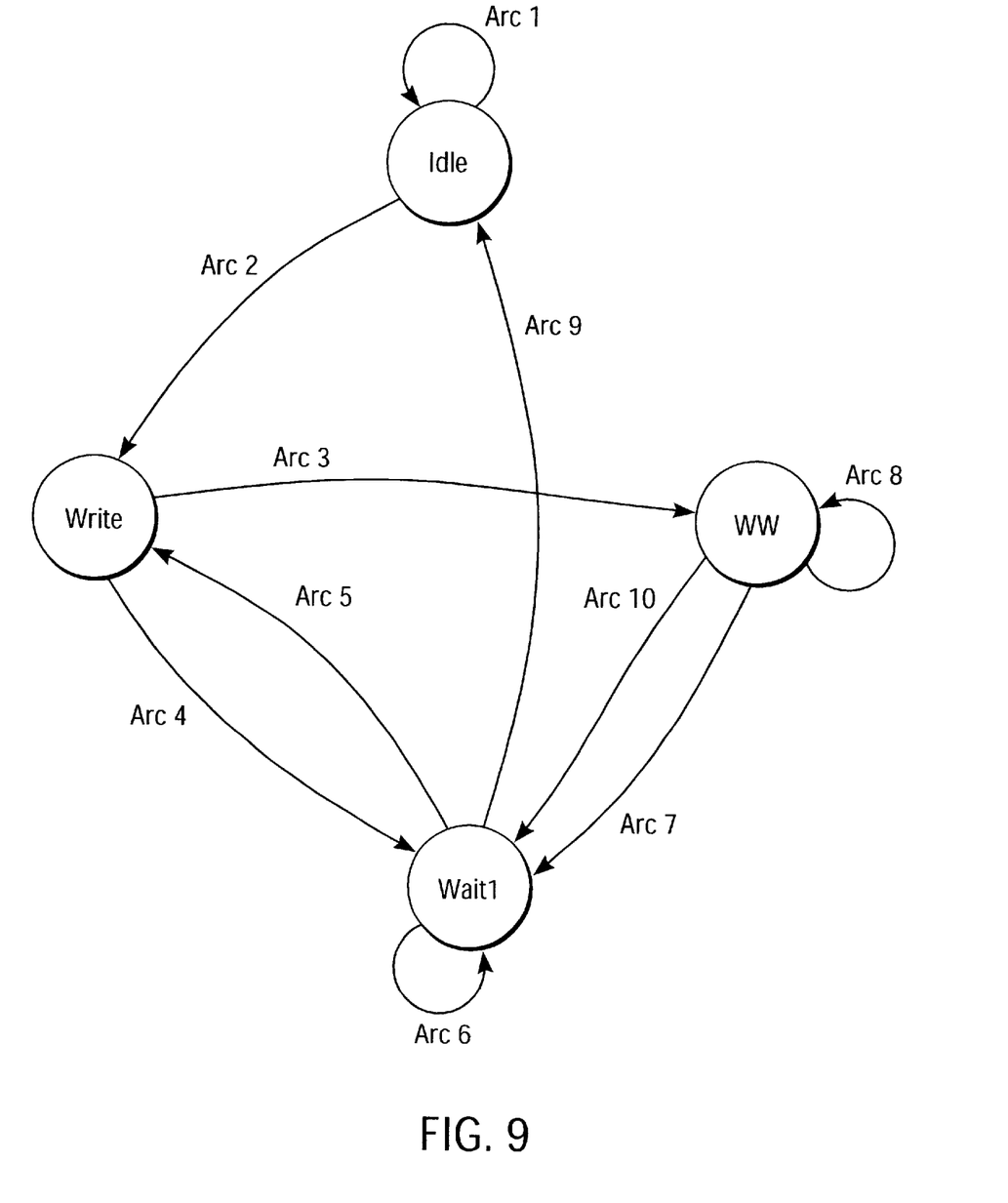
FIG. 9 illustrates an exemplary state machine for one embodiment of the present invention; and, FIG. 10 is a chart containing a description of the state machine illustrated in FIG. 9.
Figure 10:
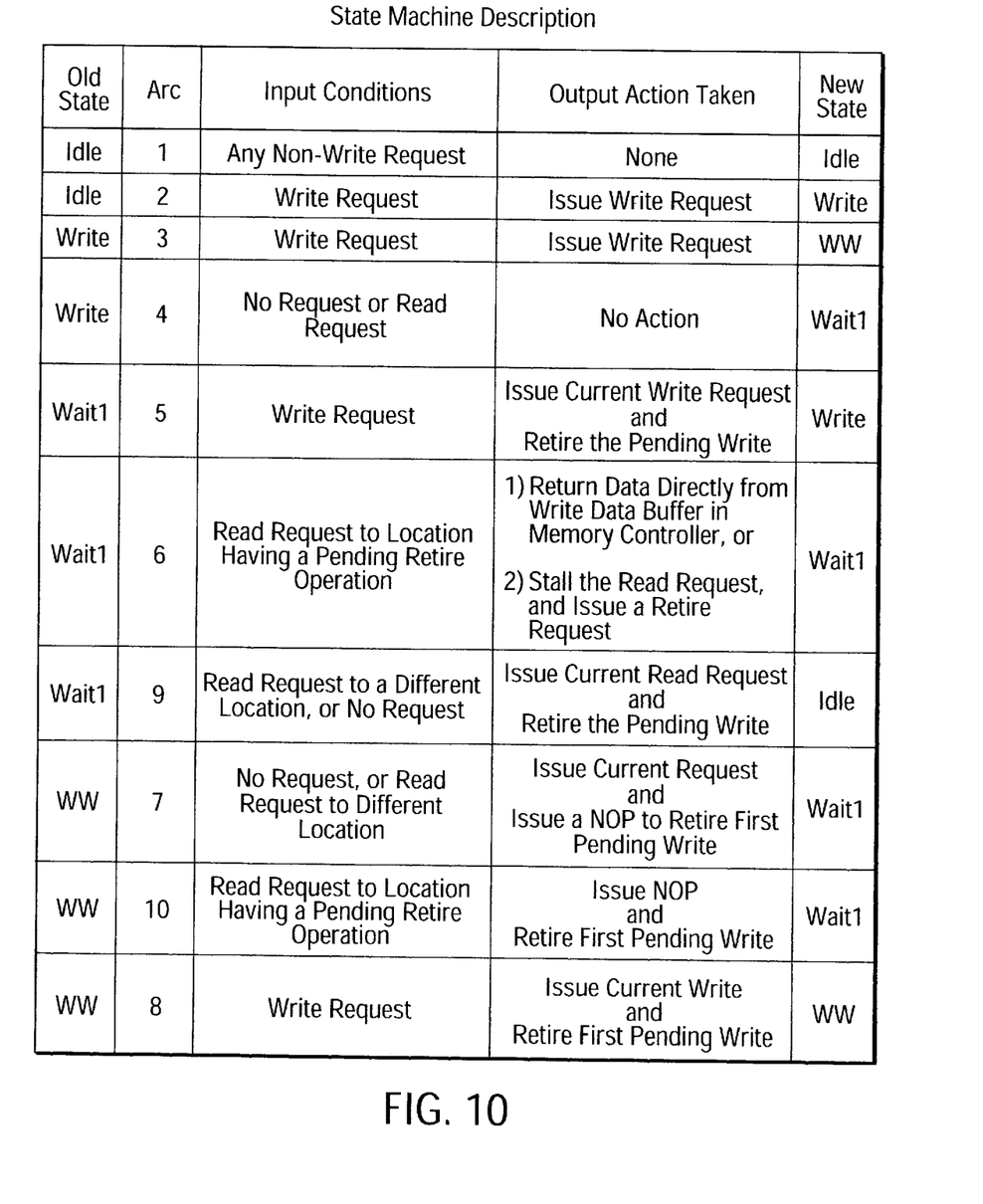

Consistent with the exemplary algorithm above, the state machine illustrated in FIG. 9 includes four (4) states: Idle, Write, Wait, and double Write (WW). Transitions between these states for given conditions are shown by Arcs 1 through 10. A description of each transition arc is given in the Table of FIG. 10.

The foregoing algorithm and state machine illustrate one exemplary method which may be implemented within the memory controller to effectively execute memory requests in relation to pending, un-retired write data. The specific timing and resource constraints of a memory system executing a transport and retire write request may well modify the example given. For example, if other than two retire operations may be pending in the memory system, the read address comparison will be necessarily modified. Other alterations and modifications to the example presented above will occur those skilled in the art. However, the present invention is defined by the attached claims and not by the specific examples and teaching context given above.

What is claimed is:

1. A memory system controlling data access, comprising:
a memory device comprising a retire buffer;
a memory controller configured to receive a read request, and comprising:
an un-retired data buffer capable of holding at least a first write address associated with un-retired first write data stored in the retire buffer; and
a comparator configured to receive and compare at least the first write address with a read address associated with the read request;
wherein the memory controller is configured such that
upon determining in the comparator that the first write address and the read address are the same, the read request is stalled in the memory controller;
during a second time period during which the read request is received, which immediately follows a first time period during which the first write address is stored in the un-retired data buffer, the first write address remains stored in the un-retire data buffer; and,
during a third time period immediately following the second time period, the first write data is retired into memory and the first write address is removed from the un-retired write buffer.

2. The memory system of claim 1, wherein the memory system further comprises logic coupled to the comparator, responsive to a determination by the comparator that the first write address and the read address are the same, for stalling the read request within the memory controller until there is no longer a write address in the un-retired data buffer that matches the read address.

3. A method of controlling data access in a memory system comprising a memory controller and at least one memory device having a retire buffer, the method comprising:
in a first time period, receiving a first write request having an associated first write address and first write data;
transporting the first write data to a memory device retire buffer, and storing the first write address in an un-retired write buffer in the memory controller; and thereafter,
(a) in a second time period following the first time period, upon receiving in the memory controller a non-read/write request,
issuing the non-read/write request, retiring the first write data, and removing the first write address from the un-retired write buffer;
(b) in the second time period, upon receiving in the memory controller a second write request having an associated second write address and second write data,
transporting the second write data to a memory device retire buffer, and storing the second write address in an un-retired write buffer in the memory controller;
(c) in the second time period, upon receiving in the memory controller a read request having an associated read address, comparing the read address to the first write address stored in the un-retired write buffer; and,
upon determining that the read address is different from the first write address, issuing the read request, retiring the first write data, and removing the first write data from the un-retired write buffer, and
upon determining that the read address is the same as the first write address, stalling the read request, retiring the first write data, and removing the first write data from the un-retired write buffer.

4. The method of claim 3, further comprising after (b):
(d) in a third time period immediately following the second time period, upon receiving in the memory controller a non-read/write request,
issuing the non-read/write request, retiring the first write data, and removing the first write address from the un-retired write buffer;
(e) in the third time period, upon receiving in the memory controller a third write request having an associated third write address and third write data,
transporting the third write data to a memory device retire buffer, retiring the first write data, removing the first write address from the un-retired write buffer, and storing the third write address in an un-retired write buffer;
(f) in the third time period, upon receiving in the memory controller a read request having an associated read address, comparing the read address to the first and second write addresses stored in the un-retired write buffer; and,
upon determining that the read address is different from the first and second write address, issuing the read request, retiring the first write data, and removing the first write data from the un-retired write buffer, and
upon determining that the read address is the same as either the first or second write address, stalling the read request, retiring the first write data, and removing the first write data from the un-retired write buffer.

5. A method of retiring data in a memory system comprising a memory controller receiving memory requests, and at least one memory device having a retire buffer, the method comprising:
upon receiving a first write request in the memory controller during a first time period, transporting first write data associated with the first write request from the memory controller to a memory device retire buffer, storing a first write address associated with the first write request in an un-retired write buffer in the memory controller, and entering a write state;
during a second time period, immediately following the first time period, holding the first write data in the retire buffer; and,
during a third time period immediately following the second time period, retiring the first write data into memory and removing the first write address from the un-retired write buffer.

6. The method of claim of claim 5, further comprising:
during the second time period, receiving a second write request, transporting associated second write data from the memory controller to a memory device retire buffer, storing an associated second write address in the un-retired write buffer in the memory controller, and entering a write-write state.

7. The method of claim 6, further comprising:

during the third time period, receiving a non-write request;

entering a wait state.

8. The method of claim 7, further comprising:

upon determining that the non-write request is a read request having an associated read address;

comparing the read address to the first and second write addresses stored in the un-retired write buffer, and upon determining that the read address is the same as either the first or the second write address, stalling the read request in the memory controller, else issuing the read request.

9. The method of claim of claim 5, further comprising:

during the second time period, receiving a non-write request; and entering a wait state.

10. The method of claim 9, further comprising:

upon receiving a second write request during the third time period, transporting second write data associated with the second write request from the memory controller to a memory device retire buffer, storing a second write address associated with the second write request in the un-retired write buffer, and entering the write state.

11. The method of claim 9, further comprising:

upon receiving a non-read/write request during the third time period, entering a idle state.

12. The method of claim 9, further comprising:

upon receiving a read request having an associated read address during the third time period, determining whether the read address is the same as the first write address stored in the un-retired write buffer;

upon determining that the read address is the same as the first write address, stalling the read request in the memory controller, else issuing the read request.

13. A memory system, comprising:

a plurality of memory devices, each comprising a retire buffer;

a memory controller configured to receive a read request, and comprising:

an un-retired data buffer capable of storing a plurality of write addresses, including a first write address, each write address being associated with un-retired write data in a retire buffer; and a comparator configured to receive and compare the plurality of write addresses in the un-retired data buffer with a read address associated with the read request;

wherein the memory controller is configured such that:

upon determining in the comparator that a write address in the un-retired data buffer and the read address are the same, the read request is stalled in the memory controller;

during a second time period during which the read request is received, which immediately follows a first time period during which the first write address was stored in the un-retired data buffer, the first write address remains stored in the un-retire data buffer; and, during a third time period immediately following the second time period, the first write data is retired into memory and the first write address is removed from the un-retired write buffer.

14. The memory system of claim 13, wherein the plurality of write addresses stored in the un-retired data buffer includes a second write address, and the memory controller is further configured so that during the second time period the second write address is removed from the un-retired data buffer.

15. The memory system of claim 13, wherein the un-retired data buffer is a First-In, First-Out (FIFO) memory device; and the memory controller is configured such that upon determining in the comparator that the read address is the same as at least one of the plurality of write addresses, the memory controller scrolls one of the plurality of write addresses from the FIFO memory device.

16. A memory system controlling data access, comprising:

a memory device comprising a retire buffer;

a memory controller configured to receive receiving a read request, and comprising:

an un-retired data buffer capable of holding at least one a first write address associated with un-retired first write data stored in the retire buffer; and a comparator configured to receive and compare receiving and comparing the at least one the first write address with a read address associated with the read request;

wherein the memory controller is configured such that upon determining in the comparator that the at least one first write address and the read address are the same, the read request is stalled in the memory controller;

during a second time period during which the read request is received, which follows a first time period during which the first write address is stored in the un-retired data buffer, the first write address remains stored in the un-retire data buffer; and, during a third time period following the second time period, the first write data is retired into memory and the first write address is removed from the un-retired write buffer.

17. The memory system of claim 16, wherein the memory system further comprises logic coupled to the comparator, responsive to a determination by the comparator that the first write address and the read address are the same, for stalling the read request within the memory controller until there is no longer a write address in the un-retired data buffer that matches the read address.

* * * * *